(12) United States Patent
Ono

(10) Patent No.: US 9,256,952 B2
(45) Date of Patent: Feb. 9, 2016

(54) VEHICLE SPEED CALCULATOR, AND VEHICLE INCLUDING SAME

(71) Applicant: HONDA MOTOR CO., LTD., Minato-Ku, Tokyo (JP)

(72) Inventor: Tetsuya Ono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 14/156,630

(22) Filed: Jan. 16, 2014

(65) Prior Publication Data

US 2014/0212003 A1    Jul. 31, 2014

(30) Foreign Application Priority Data

Jan. 31, 2013  (JP) ................................. 2013-017647

(51) Int. Cl.
| | |
|---|---|
| *G06K 9/00* | (2006.01) |
| *G06T 7/20* | (2006.01) |
| *G01P 3/80* | (2006.01) |
| *B62J 99/00* | (2009.01) |
| *B60W 40/105* | (2012.01) |

(52) U.S. Cl.
CPC ................ *G06T 7/20* (2013.01); *B60W 40/105* (2013.01); *B62J 99/00* (2013.01); *G01P 3/806* (2013.01); *B60W 2420/42* (2013.01); *B60W 2420/62* (2013.01); *B60Y 2200/12* (2013.01); *B62J 2099/0013* (2013.01); *B62K 2207/02* (2013.01)

(58) Field of Classification Search
USPC .......................................................... 382/107
See application file for complete search history.

(56) References Cited

U.S. PATENT DOCUMENTS

| | | | |
|---|---|---|---|
| 8,185,308 B2* | 5/2012 | Watanabe et al. .............. 701/469 |
| 8,724,118 B1* | 5/2014 | Burke ............................ 356/614 |
| 2012/0016615 A1* | 1/2012 | Carpaij et al. ................... 702/96 |
| 2012/0044477 A1* | 2/2012 | Han ................................ 356/28 |

FOREIGN PATENT DOCUMENTS

JP         2007-278951 A      10/2007

\* cited by examiner

*Primary Examiner* — Yon Couso
(74) *Attorney, Agent, or Firm* — Carrier Blackman & Associates, P.C.; William D. Blackman; Joseph P. Carrier

(57) ABSTRACT

A vehicle speed calculator includes a vehicle speed calculation unit for calculating a vehicle speed from a traveled distance per unit time of a feature point in a captured image shot by a camera for capturing a road surface, a reference distance mark irradiation unit and an image reference distance detection unit. The reference distance mark irradiation unit irradiates a reference distance mark to the road surface in parallel with an optical axis of the camera. The reference distance mark is formed in such a manner as to have a reference distance in a longitudinal direction of a motorcycle. The image reference distance detection unit detects an image reference distance, the longitudinal length of the reference distance mark in the shot image. The vehicle speed calculation unit calculates the vehicle speed from the traveled distance using the image reference distance and the reference distance.

14 Claims, 10 Drawing Sheets

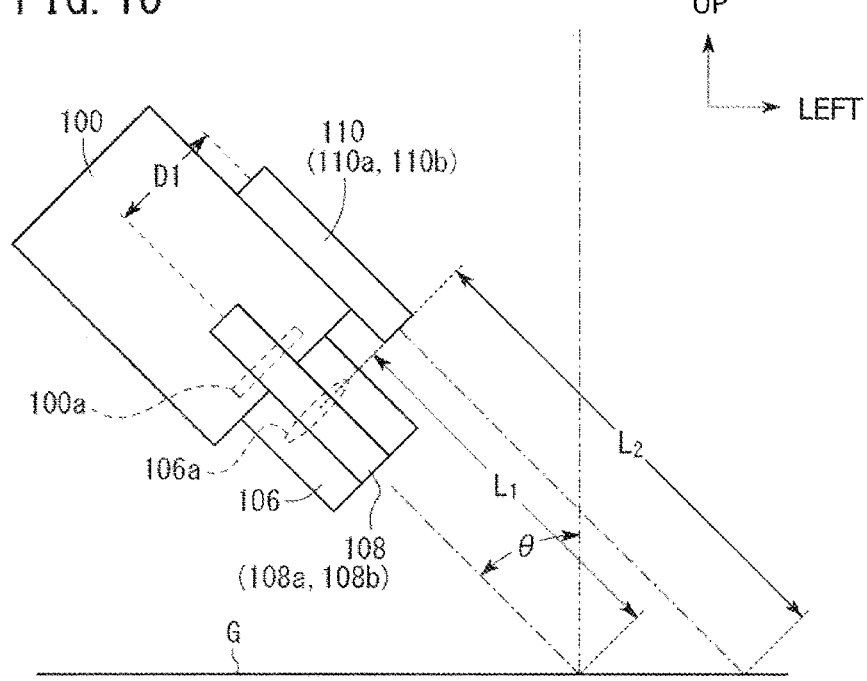

VEHICLE SPEED CALCULATOR, AND VEHICLE INCLUDING SAME

CROSS-REFERENCE TO RELATED APPLICATIONS

The present invention claims priority under 35 USC 119 based on Japanese Patent Application No. 2013-017647, filed on Jan. 31, 2013. The entire subject matter of this priority document, including specification claims and drawings thereof, is incorporated by reference herein.

BACKGROUND OF THE INVENTION

1. Field of the Invention

The present invention relates to a vehicle speed calculator for calculating vehicle speed by shooting a road surface, and to a vehicle including the same. More particularly, the present invention relates to a vehicle speed calculator which provides improved calculation accuracy of vehicle speed even when there is a change in vehicle height, and to a motorcycle including the same.

2. Description of the Background Art

There is known technique for shooting a road surface with a camera attached to a vehicle so as to measure a traveling speed and angle of the road surface relative to the camera and use them as vehicle speed and posture information.

For example, the Japanese Patent Laid-Open No. 2007-278951 discloses an approach for projecting a grid-shaped mark onto a road surface and shooting the projected grid-shaped mark with a camera so as to detect the vehicle speed, posture and other information based on the size and change of the grid-shaped mark.

However, the grid-shaped mark projected onto a road surface undergoes a change, for example, in width with change in vehicle height, making it likely that an error will occur at the time of conversion of the traveling speed of feature points obtained by optical flow into vehicle speed.

The present invention has been made to overcome such drawbacks of the existing vehicle speed calculator. Accordingly, it is one of the objects of the present invention to provide a vehicle speed calculator that offers improved calculation accuracy of vehicle speed even in the event of a change in vehicle height.

SUMMARY OF THE INVENTION

In order to achieve the above objects, the present invention according to a first feature thereof provides a vehicle speed calculator which includes an image capturing unit (100), a traveled distance detection unit (214), and a vehicle speed calculation unit (218). The image capturing unit (100) is attached to a vehicle (10) to shoot a road surface on which the vehicle is traveling. The traveled distance detection unit (214) detects a traveled distance (x) per unit time of a feature point p in a shooting range shot by the image capturing unit (100) in a shot image. The vehicle speed calculation unit (218) calculates a vehicle speed (v) of the vehicle (10) relative to the road surface from the traveled distance (x) detected by the traveled distance detection unit (214). The vehicle speed calculator (200) further includes a reference distance mark irradiation unit (108) and an image reference distance detection unit (216). The reference distance mark irradiation unit (108) irradiates a reference distance mark (109) to the road surface in parallel with an optical axis (o) of the image capturing unit (100). The reference distance mark (109) is formed in such a manner as to have a reference distance ($T_1$) in a longitudinal direction of the vehicle (10) in the shooting range. The image reference distance detection unit (216) detects an image reference distance ($Y_1$), the longitudinal length of the reference distance mark (109) irradiated by the reference distance mark irradiation unit (108) in the shot image. The vehicle speed calculation unit (218) calculates the vehicle speed (v) from the traveled distance (x) using the reference distance ($T_1$) and the image reference distance ($Y_1$) detected by the image reference distance detection unit (216).

The present invention according to a second feature thereof is characterized in that the reference distance mark irradiation unit (108) irradiates the reference distance mark (109) in parallel with the optical axis (o) of the image capturing unit (100). The reference distance mark irradiation unit (108) includes two first laser pointers (108a, 108b) that are arranged away from each other in the longitudinal direction of the vehicle.

The present invention according to a third feature thereof is characterized in that the two first laser pointers (108a, 108b) of the reference distance mark irradiation unit (108) are arranged, one at the front and the other at the rear, relative to the optical axis (o) of the image capturing unit (100).

The present invention according to a fourth feature thereof is characterized in that the two first laser pointers (108a, 108b) of the reference distance mark irradiation unit (108) are arranged in such a manner that their axial lines are aligned in the longitudinal direction of the vehicle.

The present invention according to a fifth feature thereof is characterized in that the two first laser pointers (108a, 108b) of the reference distance mark irradiation unit (108) are arranged in such a manner that their axial lines are also aligned with the optical axis (o) of the image capturing unit (100) in the longitudinal direction of the vehicle.

The present invention according to a sixth feature thereof is characterized in that the reference distance mark irradiation unit (108) is attached to the image capturing unit 100.

The present invention according to a seventh feature thereof is characterized in that the vehicle speed calculator (200) further includes second mark irradiation unit (110) which irradiates a second mark (111) to the road surface. The second mark (111) is irradiated at a position offset at least in a horizontal direction of the vehicle (10) relative to the reference distance mark (109) in the shooting range.

The present invention according to an eighth feature thereof is characterized in that the second mark (111) is formed at a position offset at least in the horizontal direction in such a manner as to have a given distance ($T_2$) in the longitudinal direction. The second mark irradiation unit (110) irradiates the second mark (111) in parallel with the optical axis (o) of the image capturing unit (100).

The present invention according to a ninth feature thereof is characterized in that the second mark irradiation unit (110) irradiates the second mark (111) in parallel with the optical axis (o) of the image capturing unit (100), and that the second mark irradiation unit (110) includes two second laser pointers (110a, 110b), which are arranged away from each other in the longitudinal direction of the vehicle.

The present invention according to a tenth feature thereof is characterized in that the two second laser pointers (110a, 110b) of the second mark irradiation unit (110) are arranged, one at the front and the other at the rear, relative to the optical axis (o) of the image capturing unit (100).

The present invention according to an eleventh feature thereof is characterized in that the two second laser pointers (110a, 110b) of the second mark irradiation unit (110) are arranged in such a manner that their axial lines are aligned in the longitudinal direction.

The present invention according to a twelfth feature thereof is characterized in that second mark irradiation unit (110) is attached to the image capturing unit (100).

The present invention according to a thirteenth feature thereof is characterized in that vehicle (10) is a motorcycle. The image capturing unit (100) is arranged at least below an engine (28a) or a vehicle body frame (12). The second mark irradiation unit (110) is arranged on one side of the image capturing unit (100). An exhaust pipe (118) runs on the other side of the image capturing unit (100).

Effects of the Invention

According to the first feature of the present invention, a reference distance mark is irradiated to a road surface in parallel with an optical axis of image capturing unit for shooting a road surface. The reference mark is formed in such a manner as to have a reference distance in a longitudinal direction. This allows projecting of the mark, an indicator of the actual distance, into a shot image, thus making it possible to find vehicle speed with high accuracy even when there is a change in vehicle height.

According to the second feature of the present invention, reference distance mark irradiation unit irradiates the reference distance mark in parallel with the optical axis of the image capturing unit. The reference distance mark irradiation unit includes two first laser pointers that are arranged away from each other in the longitudinal direction. This makes it possible to configure the extremely accurate and simple reference distance mark irradiation unit for irradiating light in parallel with the optical axis of the image capturing unit in such a manner as to maintain the reference distance.

According to the third feature of the present invention, the two first laser pointers of the reference distance mark irradiation unit are provided, one at the front and the other at the rear, relative to the optical axis of the image capturing unit. This ensures ease in securing the large reference distance, thus contributing to reduced impact of error on image recognition and providing improved calculation accuracy of vehicle speed.

According to the fourth feature of the present invention, the two first laser pointers of the reference distance mark irradiation unit are arranged in such a manner that their axial lines are aligned in the longitudinal direction. This makes it unlikely that the reference distance will vary even during banking of the vehicle, thus providing improved calculation accuracy of vehicle speed.

According to the fifth feature of the present invention, the two first laser pointers of the reference distance mark irradiation unit are arranged in such a manner that their axial lines are also aligned with the optical axis of the image capturing unit in the longitudinal direction. This makes it unlikely that the reference distance will vary even during banking of the vehicle, thus providing further improved calculation accuracy of vehicle speed.

According to the sixth feature of the present invention, the reference distance mark irradiation unit is attached to the image capturing unit. This ensures high parallelism of the optical axes of the laser pointers with the optical axis of the image capturing unit, thus providing improved calculation accuracy of vehicle speed.

According to the seventh feature of the present invention, the vehicle speed calculator includes second mark irradiation unit irradiates a second mark to the road surface. The second mark is irradiated at a position offset at least in the horizontal direction of the vehicle relative to the reference distance mark in the shooting range. This allows finding a bank angle of the vehicle.

According to the eighth feature of the present invention, the second mark is formed at a position offset at least in the horizontal direction in such a manner as to have a given distance in the longitudinal direction. The second mark irradiation unit is operable to irradiate the second mark in parallel with the optical axis of the image capturing unit. This allows finding a bank angle of the vehicle with high accuracy.

According to the ninth feature of the present invention, the second mark irradiation unit is irradiates the second mark in parallel with the optical axis of the image capturing unit and includes two second laser pointers that are arranged away from each other in the longitudinal direction. This makes it possible to configure the extremely accurate and simple second mark irradiation unit for irradiating light in parallel with the optical axis of the image capturing unit in such a manner as to maintain the given distance.

According to the tenth feature of the present invention, the two second laser pointers of the second mark irradiation unit are arranged, one at the front and the other at the rear, relative to the optical axis of the image capturing unit. This ensures ease in securing the large given distance, thus contributing to reduced impact of error on image recognition and providing improved calculation accuracy of vehicle bank angle.

According to the eleventh feature of the present invention, the two second laser pointers of the second mark irradiation unit are arranged in such a manner that their axial lines are aligned in the longitudinal direction. This makes it unlikely that the given distance will vary even during banking of the vehicle, thus providing improved calculation accuracy of vehicle bank angle.

According to the twelfth feature of the present invention, the second mark irradiation unit is attached to the image capturing unit. This ensures high parallelism of the optical axes of the second laser pointers with the optical axis of the image capturing unit, thus providing improved calculation accuracy of vehicle speed.

According to the thirteenth feature of the present invention, the vehicle is a motorcycle. The image capturing unit is arranged at least below an engine or a vehicle body frame. The second mark irradiation unit is arranged on one side of the image capturing unit. The exhaust pipe runs on the other side of the image capturing unit. This prevents upsizing of the vehicle as a result of the mounting of the vehicle speed calculator. Moreover, this allows bringing the optical axis of the image capturing unit close to the center in the direction of the vehicle width.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 10 is a diagram illustrating the camera, the reference distance mark irradiation unit, and the second mark irradiation unit as seen from the front side of the motorcycle.

DETAILED DESCRIPTION OF ILLUSTRATIVE EMBODIMENTS

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

A detailed description will be given below of illustrative embodiments of the vehicle speed calculator according to the present invention with reference to the accompanying drawings.

Figure 1:
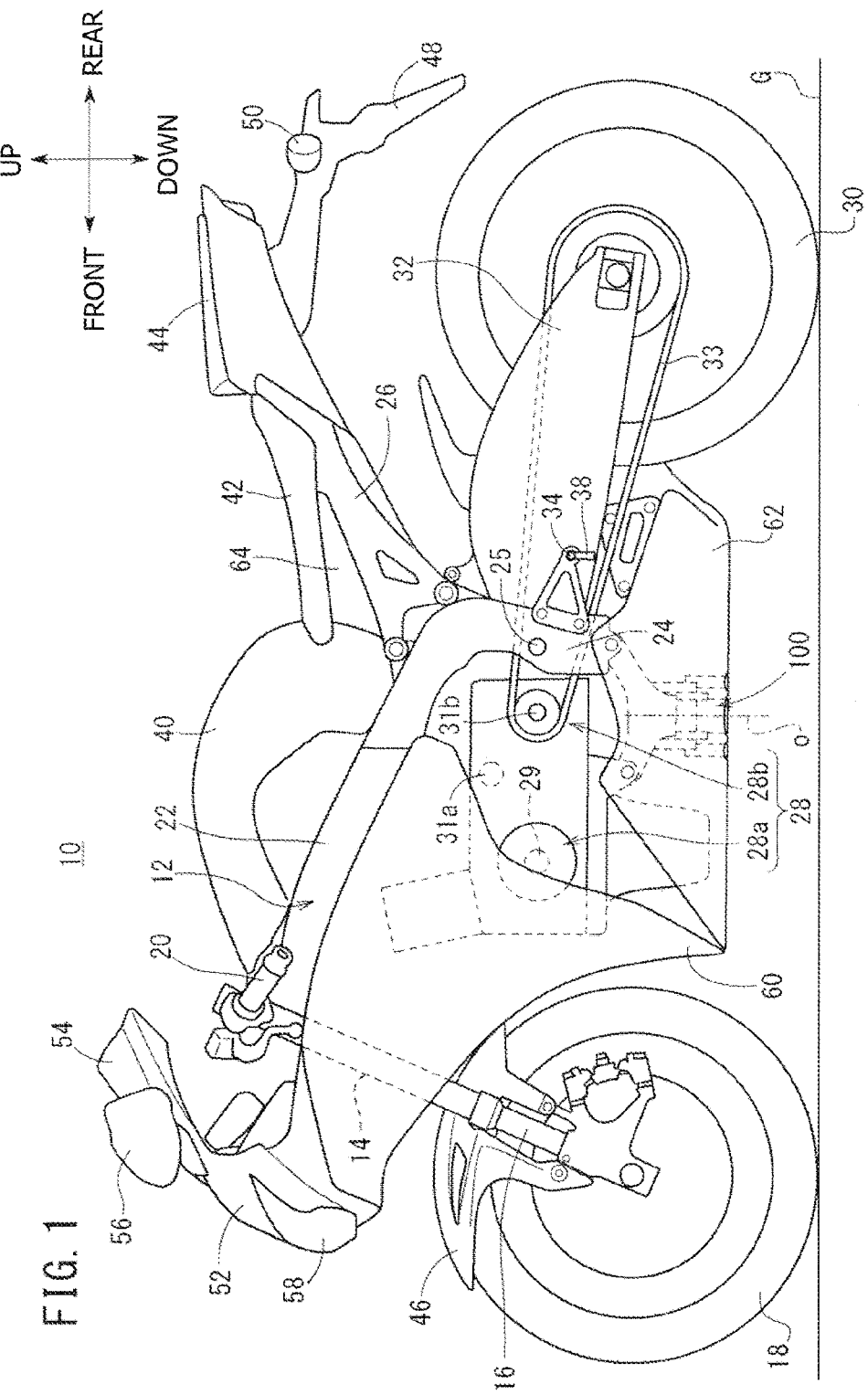
FIG. 1 is a side view of a motorcycle to which a vehicle speed calculator according to the present invention is mounted.
Figure 2:
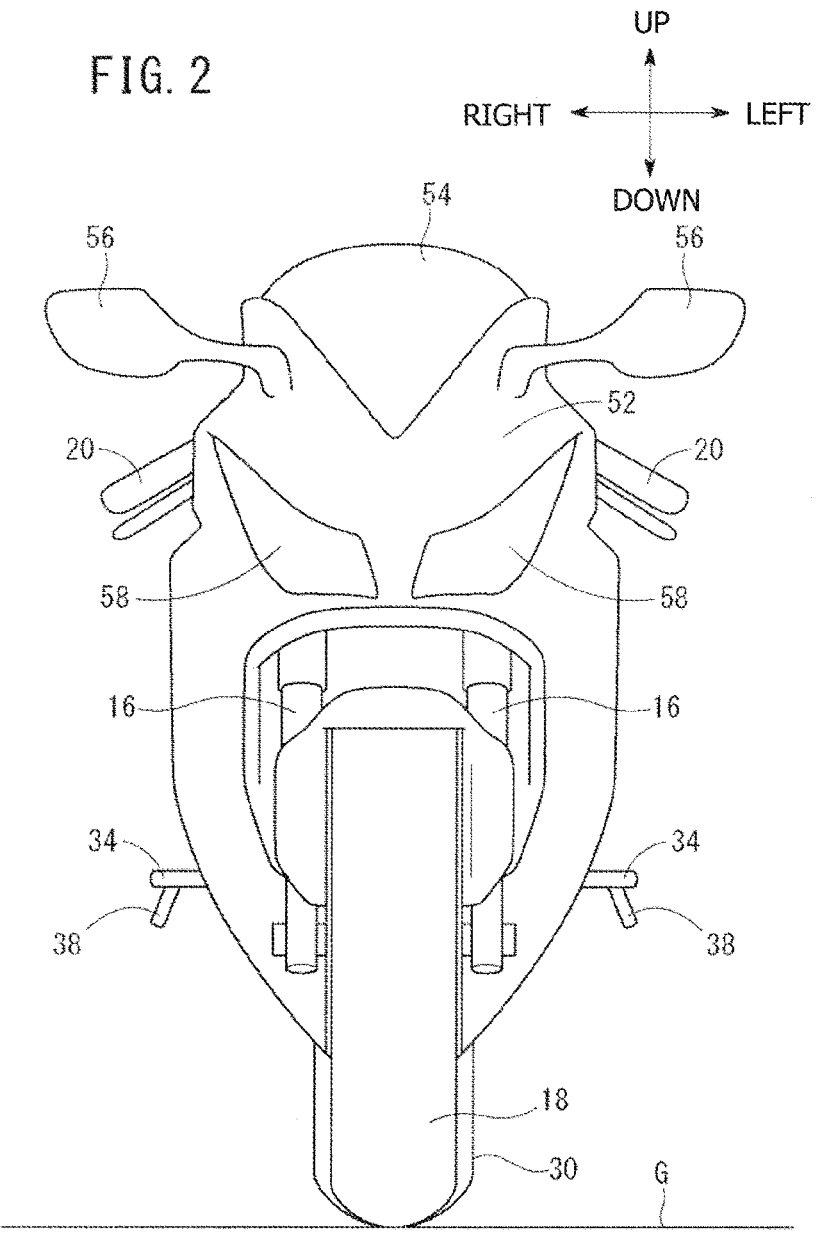
FIG. 2 is a front view of the motorcycle shown in FIG. 1.

FIG. 1 is a side view of a motorcycle 10 to which the vehicle speed calculator is mounted. FIG. 2 is a front view of the motorcycle 10 shown in FIG. 1. It may be noted that, unless otherwise specified, the longitudinal, vertical and horizontal directions will be described in accordance with the directions of the arrows shown in FIGS. 1 and 2.

The motorcycle (vehicle) 10 includes a vehicle body frame 12, a head pipe 14, a pair of left and right front forks 16, a front wheel (wheel) 18, and a steerable bar-shaped handle 20. The head pipe 14 is provided on the front edge portion of the vehicle body frame 12. The pair of left and right front forks 16 is pivotally supported by the head pipe 14. The front wheel 18 is a steering wheel pivotally supported by the pair of left and right front forks 16. The bar-shaped handle 20 is attached to the upper portion of the pair of left and right front forks 16.

The vehicle body frame 12 includes a pair of left and right main frames 22, a pair of left and right pivot plates 24, and a pair of left and right seat frames 26. The pair of left and right main frames 22 extends rearward from the head pipe 14. The pair of left and right pivot plates 24 is provided on the rear side of the pair of left and right main frames 22. The pair of left and right seat frames 26 is provided on the pair of left and right pivot plates 24 and extends rearward and diagonally upward. A power unit 28 is provided on the pair of left and right main frames 22 to produce power. A swing arm 32 that pivotally supports a rear wheel (wheel) 30, a driving wheel, with the rear edge portion thereof is supported vertically swingably by a swing arm pivot shaft (pivot shaft) 25 of the pivot plates 24. The power unit 28 houses an engine 28a, a prime mover, and a transmission 28b inside its casing. The swing arm pivot shaft 25 may be provided on the engine 28a or power unit 28.

The driving force (rotary force) of a crankshaft 29, the main shaft of the engine 28a, is transferred to a main shaft 31a of the transmission 28b first, and then output from a counter shaft 31b. The driving force output from the counter shaft 31b is transferred to the rear wheel 30 via a chain 33.

Figure 6:
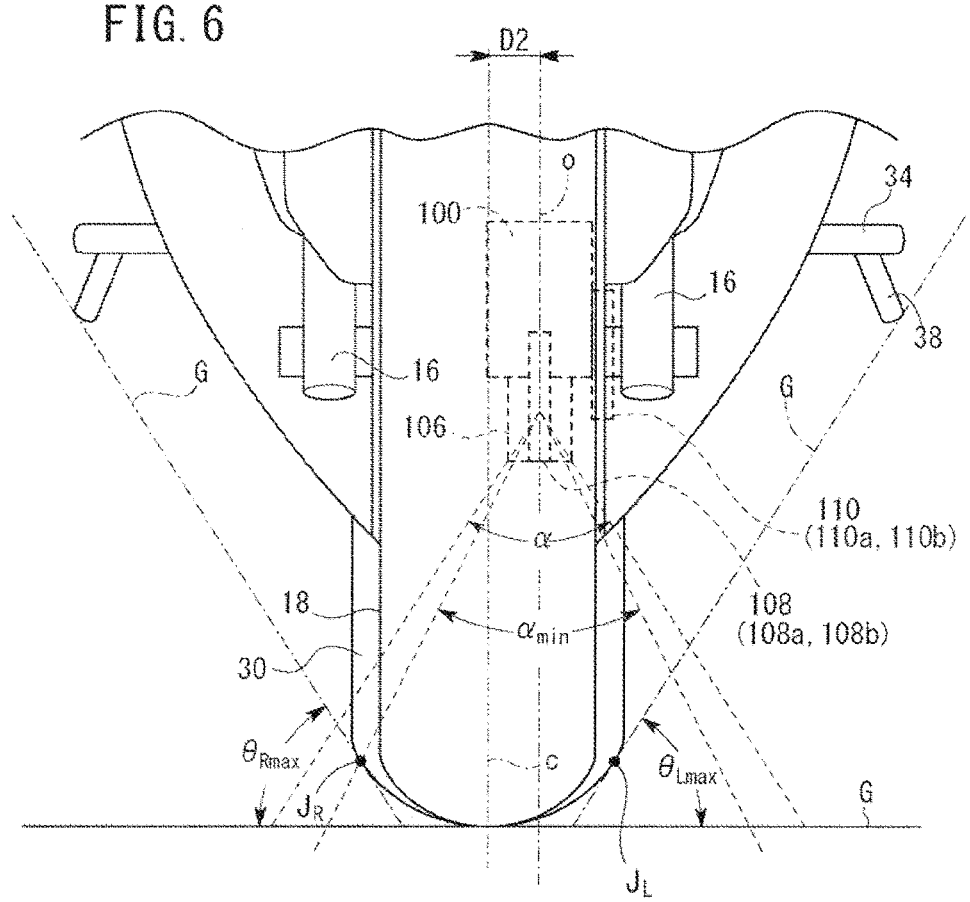
FIG. 6 is an enlarged view of main parts shown in FIG. 2.

A pair of left and right steps 34 is attached, each to one of the pivot plates 24, so that each foot of a driver is placed on one of the steps 34. A bank sensor 38 is provided on each of the steps 34 to specify a maximum bank angle $\theta_{max}$ of the motorcycle 10. As illustrated in FIG. 6, when the motorcycle 10 banks to the maximum bank angle $\theta_{max}$, one of the bank sensors 38 comes into contact with a road surface G, restricting a bank angle (roll angle) $\theta$ from increasing further. It may be noted that the maximum bank angle on the left side of the motorcycle 10 is denoted by $\theta_{Lmax}$, and that on the right side thereof by $\theta_{Rmax}$. The maximum bank angles $\theta_{Lmax}$ and $\theta_{Rmax}$ will be collectively referred to as the maximum bank angle $\theta_{max}$.

A fuel tank 40 adapted to store fuel is provided above the pair of left and right main frames 22. A driver's seat 42 on which the driver is seated is provided rearward of the fuel tank 40 and above the pair of left and right seat frames 26. A pillion seat 44 on which a pillion passenger is seated is provided rearward of the driver's seat 42. A front fender 46 is provided on the pair of left and right front forks 16. A rear fender 48 is provided on the rear portion of the pair of left and right seat frames 26. The same fender 48 supports a rear turn indicator 50.

The motorcycle 10 further includes an upper cowl 52, a window screen 54, a rear view mirror 56, a headlight 58, a middle cowl 60, an under cowl 62, and a side cover 64. The upper cowl 52 is provided on the vehicle body frame 12 to protect the front side of the motorcycle 10. The window screen 54 is provided above the upper cowl 52. The rear view mirror 56 is provided on the upper portion of the upper cowl 52 to allow the driver to check what is behind the driver. The headlight 58 is provided on the front portion of the upper cowl 52 to shine light forward. The middle cowl 60 protects the front lateral sides of the motorcycle 10. The under cowl 62 is provided on the lower portion of the middle cowl 60 and extends rearward of the vehicle. The side cover 64 is provided above the seat frames 26 to cover areas from the upper portion of the seat frames 26 to the lower portion of the driver's seat 42. A front turn indicator is built into the rear view mirror 56.

A camera (image capturing unit) 100 is arranged at a position below the power unit 28 to shoot the road surface G from below the power unit 28. An attachment structure of the camera (image capturing unit) 100 making up the vehicle speed calculator to the motorcycle 10 is described herein below.

Figure 3:
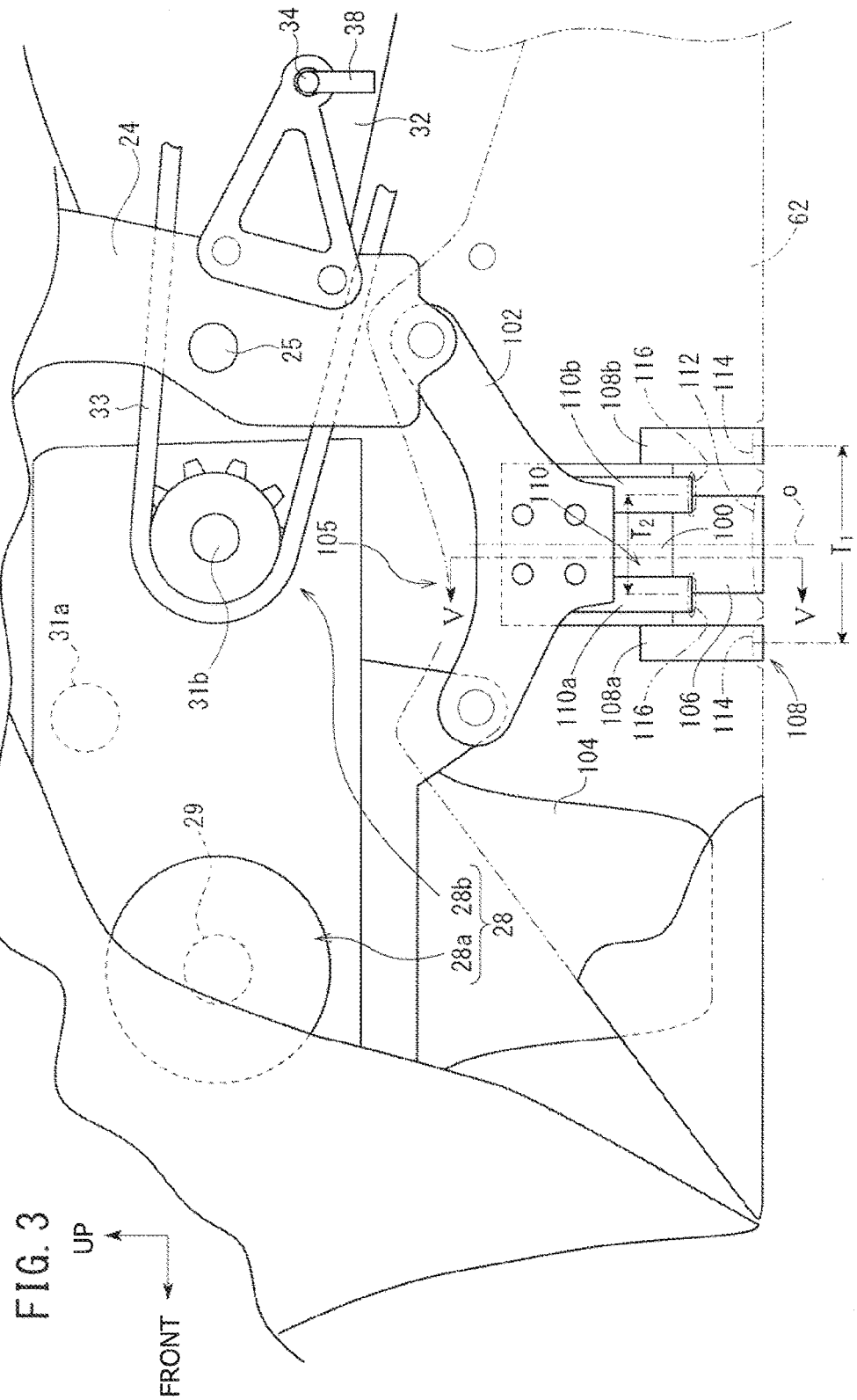
FIG. 3 is a diagram illustrating the camera attachment structure as seen from the left side of a power unit of the motorcycle shown in FIG. 1.
Figure 4:
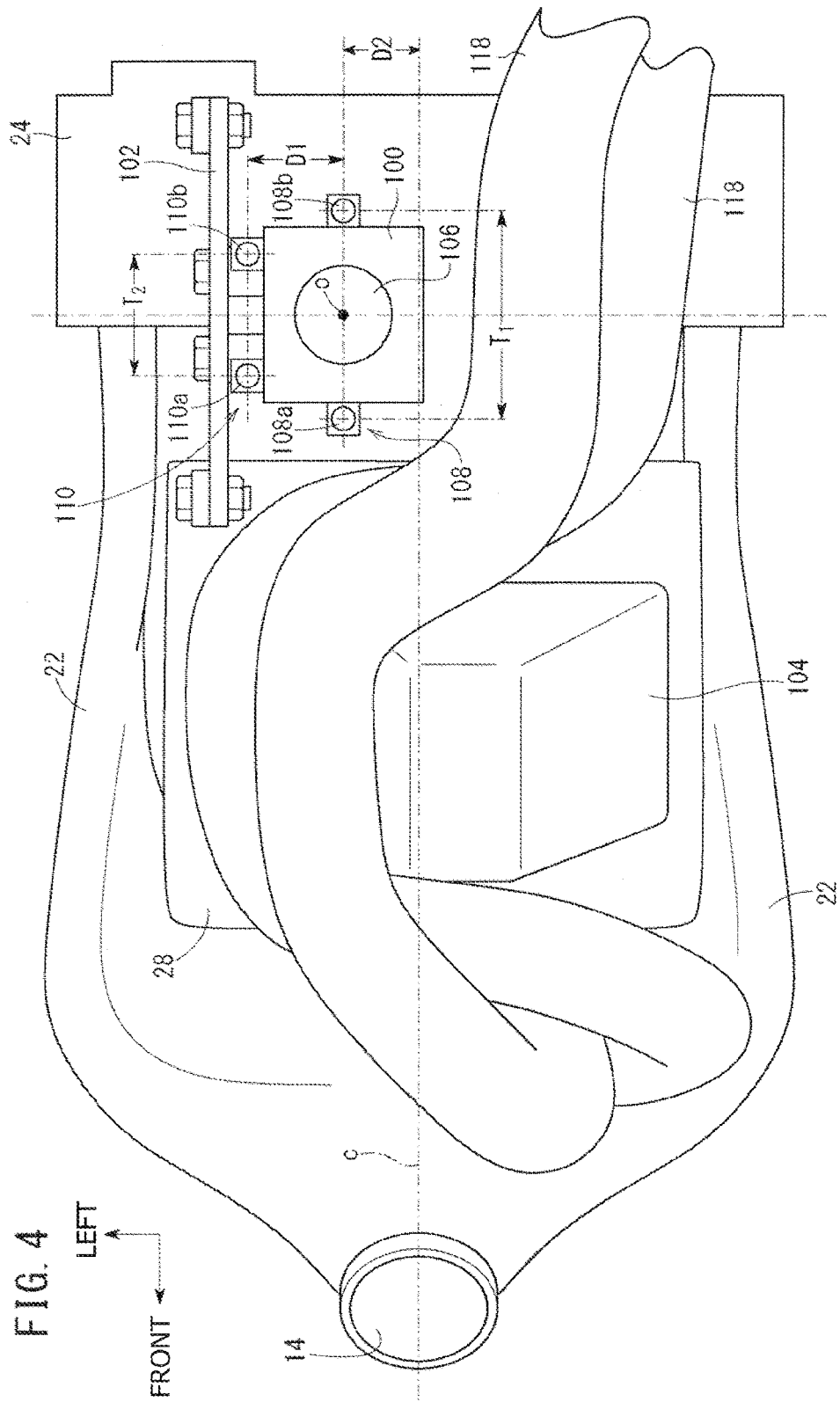
FIG. 4 is a diagram illustrating the camera attachment structure as seen from the bottom of the power unit.
Figure 5:
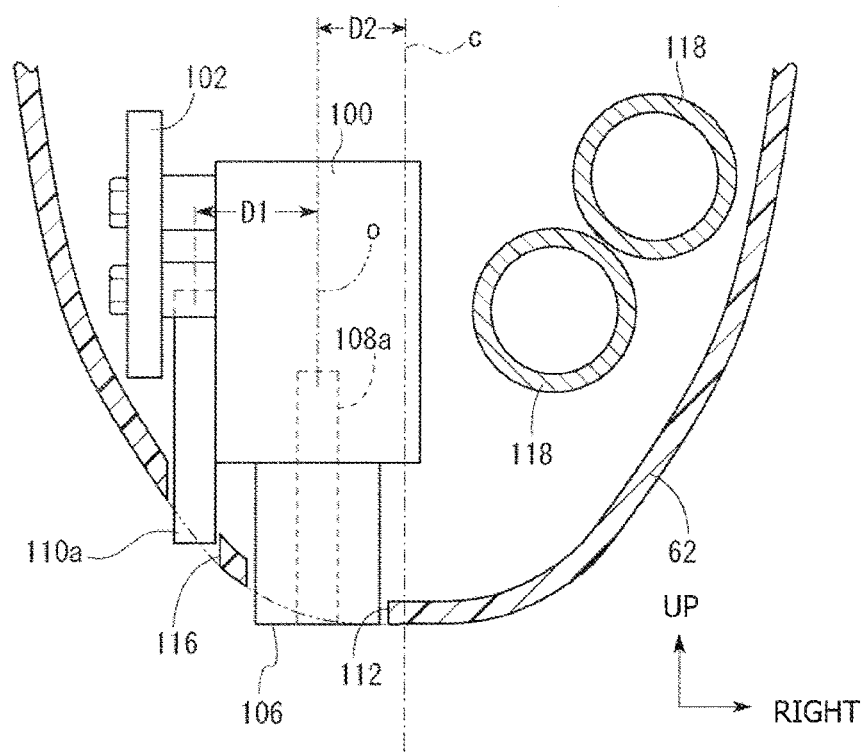
FIG. 5 is an arrow sectional view along line V-V in FIG. 3.

FIG. 3 is a diagram illustrating the attachment structure of the camera 100 as seen from the left of the power unit 28. FIG. 4 is a diagram illustrating the attachment structure of the camera 100 as seen from the bottom of the power unit 28. FIG. 5 is an arrow sectional view taken along line V-V in FIG. 3. It may be noted that the unnecessary parts are not shown for simplification of the description.

As illustrated in FIG. 3, the camera 100 is located below the power unit 28 (engine 28a), and more rearward than the center of the crankshaft 29 and forward of the swing arm pivot shaft 25. The camera 100 is fastened to and supported by the lower portions of the power unit 28 (engine 28a) and the pivot plates 24. More specifically, the camera 100 is attached to a stay 102 that is suspended by the lower portions of the power unit 28 and the pivot plates 24. It may be noted that the camera 100 need only be fastened to and supported by at least either the lower portion of the power unit 28 or the lower portion of the pivot plates 24. The camera 100 may be provided at a position below the swing arm 32.

The engine 28a includes an oil pan 104 formed below the crankshaft 29 in such a manner as to bulge (protrude) downwardly. The camera 100 and the stay 102 are provided in a concave portion 105 that is provided rearward of the oil pan 104. The concave portion 105 is formed with the downwardly bulging oil pan 104.

Figure 9:
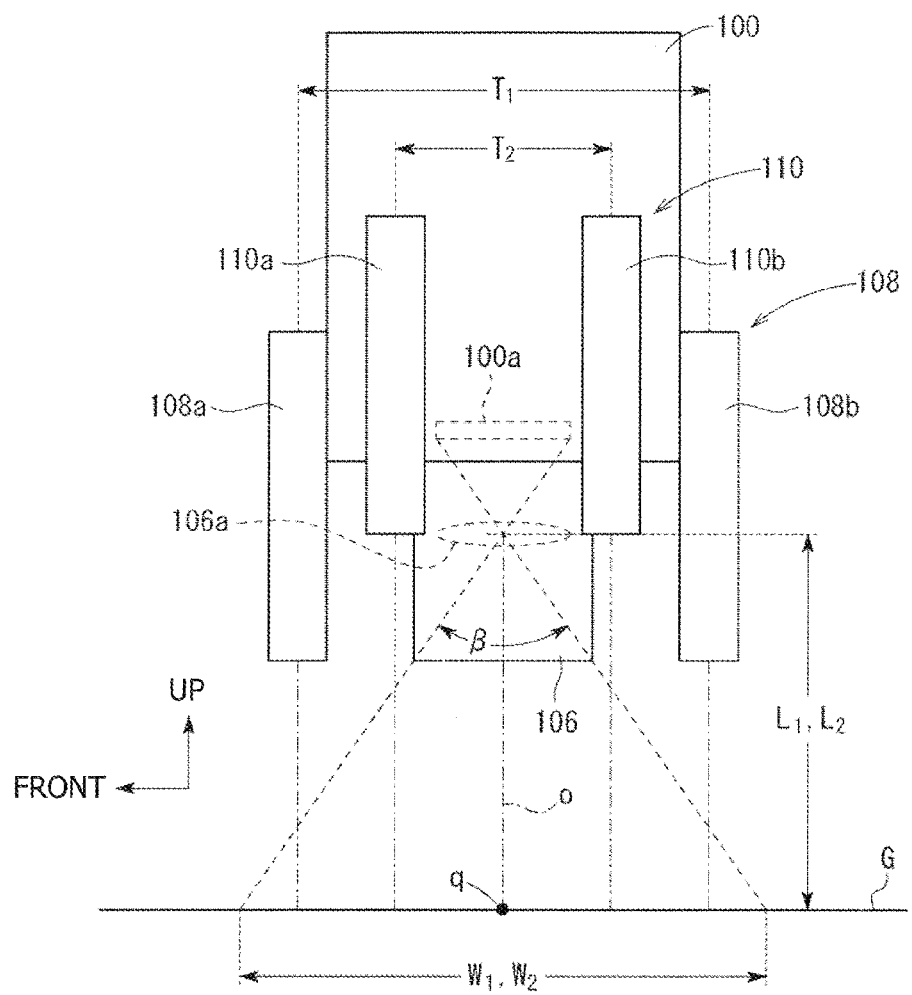
FIG. 9 is a diagram illustrating the camera, reference distance mark irradiation unit, and second mark irradiation unit as seen from a left side of the motorcycle.

A lens barrel 106 is attached at the center of the lower portion of the camera 100. The lens barrel 106 has a lens 106a (FIG. 9) adapted to form an image of a subject on an imaging element 100a (FIG. 9). The optical axis of the lens 106a serves as an optical axis o of the camera 100. The optical axis o of the camera 100 may be designed in such a manner as to be approximately vertical to the flat road surface G when the motorcycle 10 is upright to the road surface G. A reference distance mark irradiation unit 108 and a second mark irradiation unit 110 are attached to the camera 100.

The reference distance mark irradiation unit 108 irradiates a reference distance mark to the road surface G in parallel with the optical axis o of the camera 100 (in parallel therewith as seen from the side and front). The reference distance mark is formed in such a manner as to have a longitudinal reference distance $T_1$ [mm] (e.g., 90 mm). The reference distance mark irradiation unit 108 is attached at the front and rear of the camera 100 in such a manner as to irradiate the reference distance mark in the shooting range of the camera 100.

The reference distance mark irradiation unit 108 includes two first laser pointers 108a and 108b that are arranged in the longitudinal direction of the vehicle. The first laser pointers 108a and 108b irradiate laser beams. The first laser pointers 108a and 108b are arranged, one at the front and the other at the rear, relative to the optical axis o of the camera 100 in such a manner that their axial lines (optical axes) are aligned in the longitudinal direction.

In the present embodiment, the optical axis o of the camera 100 is located on a line connecting the axial lines of the two first laser pointers 108a and 108b. That is, the two first laser pointers 108a and 108b are arranged in such a manner that their axial lines are also aligned with the optical axis o of the camera 100 in the longitudinal direction (FIG. 4) of the vehicle. The two first laser pointers 108a and 108b are arranged at the reference distance $T_1$ from each other in the longitudinal direction. This allows irradiating two points, i.e., a reference distance mark, to the road surface G. The two points are formed in such a manner as to have the reference distance $T_1$ in the longitudinal direction.

The second mark irradiation unit 110 irradiates a second mark to the road surface G in parallel with the optical axis o of the camera 100 (in parallel therewith as seen from the side and front). The second mark is formed in such a manner as to have a longitudinal given distance $T_2$ [mm] (e.g., 70 mm). The second mark irradiation unit 110 is attached on the left side of the camera 100 in such a manner as to irradiate the second mark in the shooting range of the camera 100.

The second mark irradiation unit 110 includes two second laser pointers 110a and 110b that are arranged in the longitudinal direction of the vehicle. The second laser pointers 110a and 110b irradiate laser beams. The second laser pointers 110a and 110b are arranged, one at the front and the other at the rear, relative to the optical axis o of the camera 100 in such a manner that their axial lines (optical axes) are aligned in the longitudinal direction (FIG. 4) of the vehicle.

The second mark irradiation unit 110 is arranged to be offset to the left relative to the reference distance mark irradiation unit 108 by a distance (offset distance) D1 (e.g., 35 mm). The two second laser pointers 110a and 110b are arranged at the given distance $T_2$ from each other in the longitudinal direction. This allows irradiating two points (second mark) to the road surface G. The two points are formed in such a manner as to have the given distance $T_2$ in the longitudinal direction.

As illustrated in FIGS. 3 and 5, the camera 100, the reference distance mark irradiation unit 108, and the second mark irradiation unit 110 are housed in the under cowl 62 that covers the lower portion of the power unit 28. Openings 112, 114 and 116 are formed in the under cowl 62. The opening 112 is provided to shoot an image and located at a position appropriate to the optical axis o of the camera 100. The opening 114 is provided to irradiate the reference distance mark and located at a position appropriate to the optical axis of the reference distance mark irradiation unit 108. The opening 116 is provided to irradiate the second mark and located at a position appropriate to the optical axis of the second mark irradiation unit 110.

The under cowl 62 does not interfere with shooting by the camera 100 or irradiation by the reference distance mark irradiation unit 108 and the second mark irradiation unit 110 due to the openings 112, 114 and 116. Although the openings 112, 114 and 116 are provided independently of each other, the openings 112, 114 and 116 may be connected to each other.

As illustrated in FIG. 4, the camera 100 is arranged where the optical axis o thereof is offset to the left from a vehicle width centerline c by a distance (offset distance) D2 (e.g., 35 mm). The second mark irradiation unit 110 is arranged on the left side of the camera 100. The smaller the offset distance D2, the closer the optical axis o of the camera 100 to the vehicle width centerline c. Therefore, the smaller the offset distance D2, the better, with "0" being the best. As illustrated in FIG. 4, on the other hand, the oil pan 104 is provided slightly to the right of the power unit 28. Therefore, the exhaust pipe 118 adapted to emit exhaust gas of the engine 28a is arranged in such a manner as to run on the left side of the oil pan 104, then bend to the right and run on the right side of the camera 100. As described above, the second mark irradiation unit 110 is attached on the side of the camera 100 free from the exhaust pipe 118. This makes it possible to bring the optical axis o of the camera 100 close to the vehicle width center. It may be noted that the exhaust pipe 118 is also provided in the under cowl 62.

A description will be given next of the view angle of the camera 100.

FIG. 6 is an enlarged view of the main parts shown in FIG. 2. A view angle α of the camera 100 along the vehicle width (hereinafter the vehicle width view angle) may be set to fall within the range of $\alpha_{min} \leq \alpha \leq \alpha_{max}$. $\alpha_{min}$ is the angle at which contact points $J_L$ and $J_R$ of the rear wheel 30 with the road surface G (rear wheel contact points) fit into the view angle of the camera 100 as seen from the front when the motorcycle 10 banks to the maximum bank angle $\theta_{max}$ as seen from the front of the vehicle. $\alpha_{max}$ is the angle expressed by $\alpha_{max}=(90°-$ max. bank angle $\theta_{max})\times 2$. If the vehicle width view angle α of the camera 100 is $\alpha_{max}$, one side of the vehicle width view angle α of the camera 100 is approximately parallel with the road surface G when the motorcycle 10 banks to the maximum bank angle $\theta_{max}$, thus causing the camera 100 to shoot the horizon. Therefore, setting the vehicle width view angle α smaller than the angle $\alpha_{max}$ keeps the shooting range at or below the horizon (ensures that no scene above the horizon is shot in the shot image), thus making it possible to shoot many images of the road surface G.

A description will be given here of the reason why the vehicle width view angle α of the camera 100 has been set equal to or greater than $\alpha_{min}$ and smaller than $\alpha_{max}$.

Considering the verification of the road surface conditions, for example, during shooting of the road surface G below the motorcycle 10 by the camera 100, there is a demand to shoot, to the extent possible, the actual road surface on which the wheel, the rear wheel 30 in particular will probably run. Further, in the case of the motorcycle 10, tire contact points vary depending on the bank angle θ. Therefore, it is desirable to secure the vehicle width view angle α that is large enough to include at least both the rear wheel contact points $J_L$ and $J_R$ at the time of the maximum left and right banking, respectively.

On the other hand, expanding the shooting range by unnecessarily increasing the vehicle width view angle α leads to unnecessarily obtaining image information other than the road surface G, thus resulting in poor efficiency. During banking in particular, the rear wheel contact point moves to one side, left or right. As a result, the center of the shot image moves toward the direction (other side) away from the contact point with the road surface on which the rear wheel 30 will probably run. As a consequence, the area near the rear wheel contact points $J_L$ and $J_R$, an area of interest, is limited to an extremely small portion of the shot image. Therefore, the smaller the vehicle width view angle α of the camera 100, the better as long as the rear wheel contact points JL and JR, at the time of the maximum banking as seen from the front of the vehicle, fit into the vehicle width view angle α. From this point of view, the vehicle width view angle α of the camera 100 has the relation $α_{min} ≤ α < α_{min}$.

Further, in order to secure a necessary shooting width while at the same time reducing the view angle of the camera 100 to the extent possible, it is necessary to arrange the focus of the camera 100 as upward as possible. In the present embodiment, therefore, the camera 100 is arranged in the concave portion 105 located more forward than the swing arm pivot shaft 25 and rearward of the oil pan 104. This arranges the camera 100 as upward as possible, thus making it possible to meet the above requirement for the vehicle width view angle α of the camera 100.

It may be noted that, as understood from FIG. 6, the optical axis o may be arranged at least within the tire width of the rear wheel 30. Also, the camera 100, the reference distance mark irradiation unit 108, and the second mark irradiation unit 110 may be arranged inside the tire width of the rear wheel 30. Further, at least the camera 100 and the reference distance mark irradiation unit 108 should be arranged inside the tire width of the front wheel 18.

As described above, the camera 100 is arranged below the engine 28a or the swing arm 32, thus making it possible to arrange the camera 100 where there are only a small number of parts that might present an obstacle to shooting the road surface. Further, the camera 100 is supported at least by either the engine 28a or at least one of the pivot plates 24 making up the vehicle body frame 12. The camera 100 is arranged more rearward than the center of the crankshaft 29 that primarily generates vibration. This allows the camera 100 to be located where it is not likely to be affected by vibration while ensuring ease in shooting sharper images.

The camera 100 is arranged more forward than the swing arm pivot shaft 25, thus making it possible to arrange the camera 100 with no possible interference with the vertically vibrating swing arm 32. Further, the camera 100 is arranged in the concave portion 105 provided rearward of the oil pan 104. This makes it possible to secure a capacity of the oil pan 104 and a space for arranging the camera 100.

The camera 100 is housed in the under cowl 62. This suppresses air resistance and protects the camera 100 from water, dust and other contaminants. This also provides improved appearance. It is more advantageous in suppressing air resistance and protect against dust particularly if the camera 100 and the first and second laser pointers 108a, 108b, 110a and 110b are kept under the surface of the under cowl 62. Further, the camera 100 is set to the vehicle width view angle α that ensures that no scene above the horizon is shot in the shot image even when the motorcycle 10 banks fully. This prevents, to the extent possible, any image other than the road surface G from appearing.

The vehicle width view angle α of the camera 100 is set in such a manner that the rear wheel contact points $J_L$ and $J_R$ at the time that the motorcycle 10 banks fully as seen from the front of the vehicle, respectively, fit into the view angle of the camera 100 as seen from the front. This makes it possible to shoot the road surface G on which the rear wheel 30 will probably run at all times irrespective of the bank angle θ.

Figure 7:
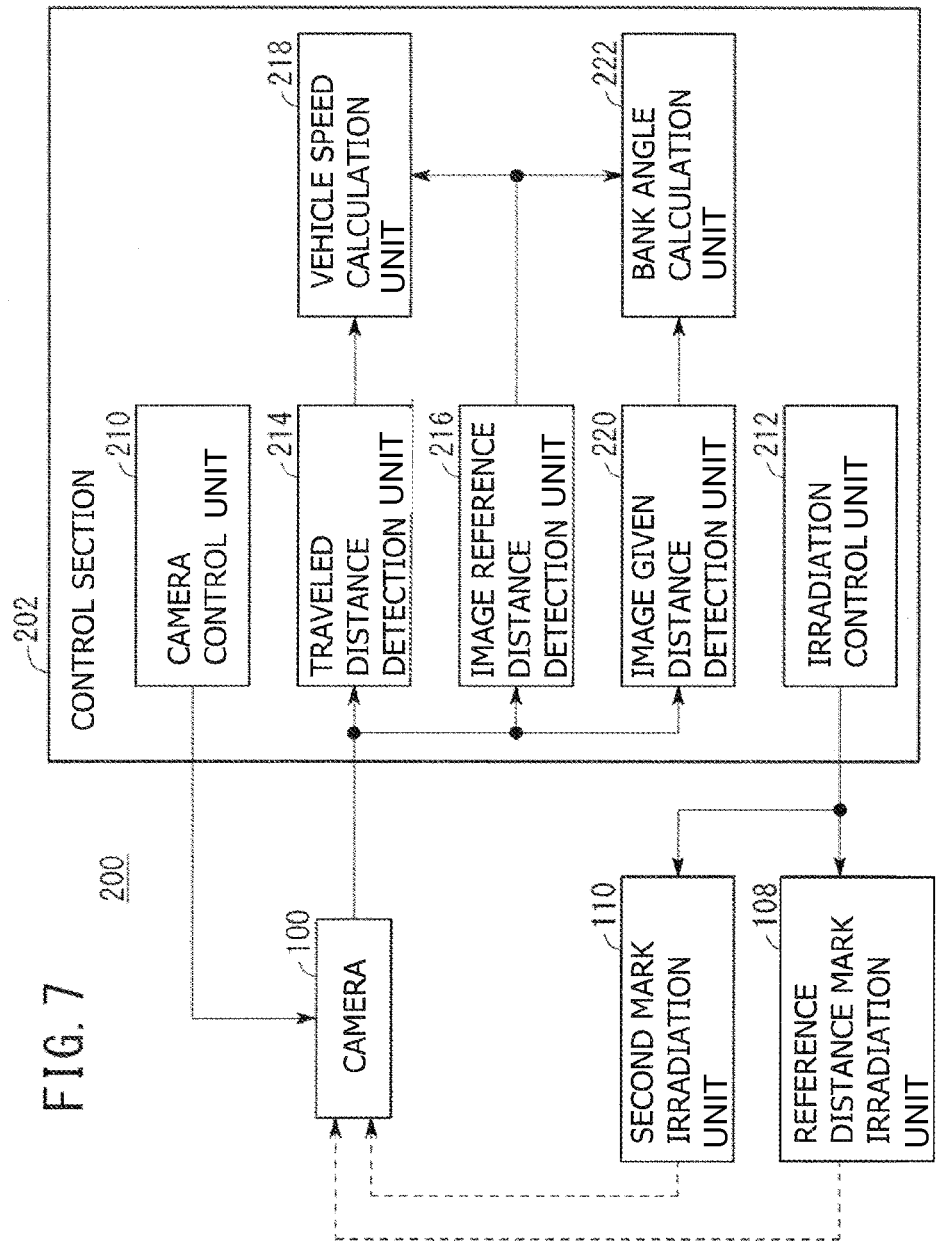
FIG. 7 is a functional block diagram of the vehicle speed calculator.

FIG. 7 is a functional block diagram of the vehicle speed calculator 200. The vehicle speed calculator 200 includes the camera 100, the reference distance mark irradiation unit 108, the second mark irradiation unit 110, and a control section 202. The control section 202 includes a camera control unit 210, an irradiation control unit 212, a traveled distance detection unit 214, an image reference distance detection unit 216, a vehicle speed calculation unit 218, an image given distance detection unit 220, and a bank angle calculation unit 222. The control section 202 is a computer having a CPU, memory and other parts. The control section 202 serves as the control section 202 of the present embodiment by the CPU loading a program from the memory.

The camera control unit 210 controls shooting performed by the camera 100. The camera control unit 210 controls the camera 100 in such a manner as to shoot the road surface G at given intervals (frame rate) (e.g. 500 fps) during driving of the motorcycle 10. The irradiation control unit 212 controls irradiation performed by the reference distance mark irradiation unit 108 and the second mark irradiation unit 110. The irradiation control unit 212 controls the reference distance mark irradiation unit 108 and the second mark irradiation unit 110 in such a manner as to irradiate light to the road surface G during driving of the motorcycle 10. At this time, the irradiation control unit 212 may control the reference distance mark irradiation unit 108 and the second mark irradiation unit 110 in such a manner as to irradiate light during an exposure period of the camera 100 and stop irradiating light during any other period.

The traveled distance detection unit 214 detects the traveled distance x [pixels/sec] per unit time (e.g., per second) of the feature point p in the shooting range shot by the camera 100 in the shot image. That is, the traveled distance detection unit 214 detects the traveled distance x per unit time of the feature point p by detecting the location of the feature point p, available in an image shot previously (previously shot image), in an image shot next (currently shot image) based on block matching, representative point matching or other technique.

Figure 8:
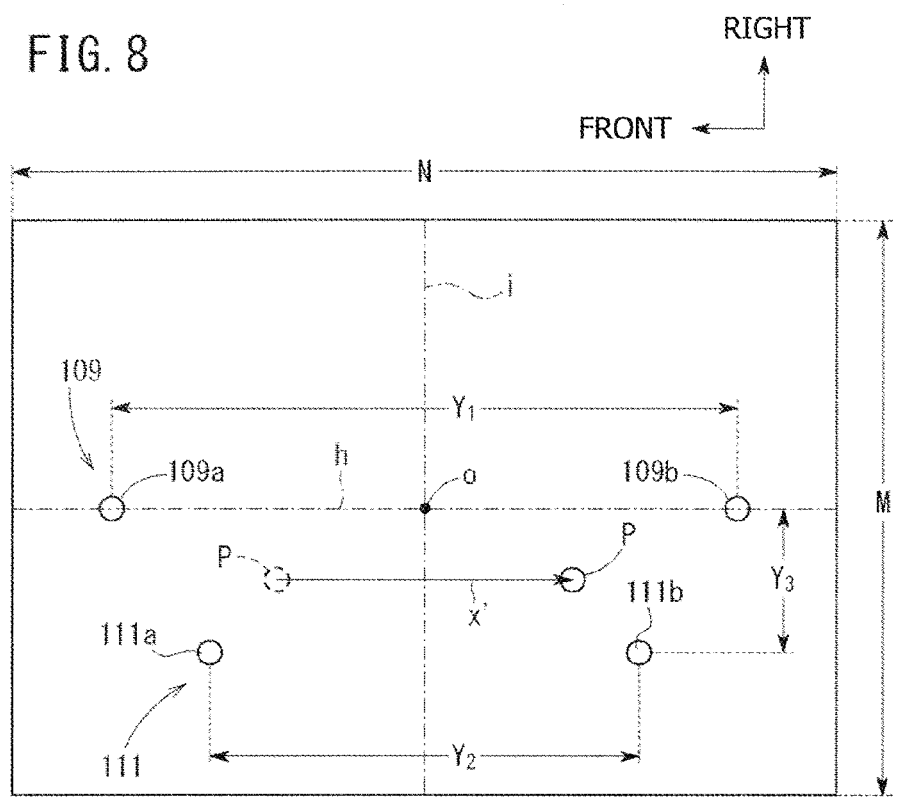
FIG. 8 is a diagram illustrating an image shot by a camera.

Here, the feature point p is a point extracted from a pattern on the road surface G, shading produced by projections and recessions, and so on. Further, the traveled distance x is strictly the traveled distance x in the shot image. Therefore, even if the vehicle speed v [mm/sec] is the same, the value thereof varies depending on the height of the motorcycle 10 (i.e., height of the camera 100 relative to the road surface G). For example, even if the vehicle speed v is the same but the vehicle is tall, the traveled distance x is smaller than if the vehicle is short. It may be noted that the shot image shown in FIG. 8 illustrates the traveled distance x' per 1/500 of a second.

The image reference distance detection unit 216 detects an image reference distance $Y_1$ [pixels], which is a longitudinal length of the reference distance mark irradiated by the reference distance mark irradiation unit 108 in the shot image. The longitudinal direction in the shot image is the same as the longitudinal direction of the motorcycle 10. The image reference distance $Y_1$ represents the reference distance $T_1$ in the shot image and therefore varies depending on the height of the motorcycle 10. For example, even if the vehicle speed v is the same but the vehicle is tall, the image reference distance $Y_1$ is smaller than if the vehicle is short. It may be noted that the image reference distance $Y_1$ is shown in the shot image of FIG. 8. Also, in FIG. 8, a reference distance mark 109 in the shot image is shown. The reference distance mark 109 is made up of points 109a and 109b.

The points 109a and 109b should be located equidistantly from the optical axis o. That is, the first laser pointers 108a and 108b may be provided in such a manner as to irradiate light in parallel with the optical axis o at the positions equidistant from the optical axis o. The optical axis o is located at the center of the shot image. It may be noted that straight lines h and i are shown in FIG. 8 for reasons of convenience. The straight line h extends in the longitudinal direction of the shot image from the center (optical axis o) of the shot image. The straight line i extends in the horizontal direction of the shot image from the center (optical axis o) of the shot image. The points 109a and 109b of the reference distance mark 109 are located on the straight line h.

The vehicle speed calculation unit 218 calculates the vehicle speed v [mm/sec] from the traveled distance x detected by the traveled distance detection unit 214. Here, the traveled distance x varies with change in the vehicle height even if the vehicle speed v is the same. The same distance x varies all the more for the motorcycle 10 whose height is likely to change as a result of acceleration and deceleration or banking as compared to a four-wheeled vehicle. In order to provide improved accuracy of the vehicle speed v even in the event of a change in the vehicle height, the vehicle speed calculation unit 218 calculates the vehicle speed v from the traveled distance x per unit time detected by the traveled distance detection unit 214 using the image reference distance $Y_1$ detected by the image reference distance detection unit 216 and the reference distance $T_1$ of the reference distance mark 109. More specifically, the vehicle speed v is calculated by using Formula (1) shown below.

Formula (1)

$$v\left[\frac{mm}{sec}\right] = \left(x\left[\frac{pixel}{sec}\right] \times T_1[mm]\right) / Y_1[pixel] \quad (1)$$

The Image given distance detection unit 220 detects an image given distance $Y_2$ [pixels], a longitudinal length of the second mark irradiated by the second mark irradiation unit 110 in the shot image. The image given distance $Y_2$ represents the given distance $T_2$ in the shot image and therefore varies depending on the height of the motorcycle 10 or the bank angle θ. For example, even if the vehicle speed v is the same but the vehicle is tall, the image given distance $Y_2$ is smaller than if the vehicle is short. It may be noted that the image given distance $Y_2$ is shown in the shot image of FIG. 8. Further, in FIG. 8, the longitudinal distance N [pixels] of the shot image, and the horizontal distance M [pixels] of the shot image are shown.

Further, in FIG. 8, a second mark 111 in the shot image is shown. The second mark 111 is made up of points 111a and 111b. The points 111a and 111b should more preferably be located equidistantly from the optical axis o. That is, the second laser pointers 110a and 110b may be provided in such a manner as to irradiate light in parallel with the optical axis o at the positions equidistant from the optical axis o. Further, although the longer N shown in FIG. 8, the better, N may preferably be set in such a manner that neither the front wheel 18 nor the rear wheel 30 are included in the shot image.

The bank angle calculation unit 222 calculates the bank angle θ of the motorcycle 10 based on the reference distance $T_1$, the given distance $T_2$, the image reference distance $Y_1$ detected by the image reference distance detection unit 216, and the image given distance $Y_2$ detected by the Image given distance detection unit 220.

A description will be given of a calculation method of the bank angle θ of the motorcycle 10 with reference to FIGS. 9 and 10.

It may be noted that FIG. 9 illustrates the camera 100, the reference distance mark irradiation unit 108, and the second mark irradiation unit 110 as seen from the left of the motorcycle 10. FIG. 10 illustrates the camera 100, the reference distance mark irradiation unit 108, and the second mark irradiation unit 110 as seen from the front of the motorcycle 10.

First, the bank angle calculation unit 222 calculates an actual distance of the shooting range (hereinafter referred to as the actual shooting range width) $W_1$ [mm] based on the image reference distance $Y_1$ and an actual shooting range width $W_2$ [mm] based on the image given distance $Y_2$ shown in FIG. 9. More specifically, the bank angle calculation unit 222 calculates the actual shooting range widths $W_1$ and $W_2$ using Formulas (2) and (3) shown below.

Formula (2)

$$W_1[mm] = (T_1[mm]/Y_1[pixel]) \times N[pixel] \quad (2)$$

Formula (3)

$$W_2[mm] = (T_2[mm]/Y_2[pixel]) \times N[pixel] \quad (3)$$

The bank angle calculation unit 222 calculates a distance $L_1$ [mm] (FIG. 9) from an intersection point q between the optical axis o of the camera 100 and the road surface G to the center of the lens 106a based on the calculated the actual shooting range width $W_1$ using Formula (4) shown below. Further, the bank angle calculation unit 222 calculates a distance $L_2$ [mm] (FIG. 9) from the intersection point q between the optical axis o of the camera 100 and the road surface G to the center of the lens 106a based on the calculated actual shooting range width $W_2$ using Formula (5) shown below. In FIG. 9, the longitudinal view angle of the camera 100 (longitudinal view angle) is represented by β.

Formula (4)

$$L_1[mm] = (W_1[mm] \times 0.5)/\tan(\beta \times 0.5) \quad (4)$$

Formula (5)

$$L_2[mm] = (W_2[mm] \times 0.5)/\tan(\beta \times 0.5) \quad (5)$$

The bank angle calculation unit 222 calculates the bank angle θ shown in FIG. 10 using the calculated distances $L_1$ and $L_2$ and the offset distance $D_1$ between the reference distance mark irradiation unit 108 and the second mark irradiation unit 110. More specifically, the bank angle calculation unit 222 calculates the bank angle θ using Formula (6) shown below.

Formula (6)

$$\theta = \tan^{-1}\{(L_2[mm] - L_1[mm])/D1[mm]\} \quad (6)$$

The vehicle speed v and the bank angle θ calculated by the vehicle speed calculator 200 are used, for example, for traction control and ABS control.

As described above, according to the above embodiment, the reference distance mark 109 is irradiated to the road surface G in the shooting range of the camera 100 in parallel with the optical axis o of the camera 100. The same mark 109 is formed in such a manner as to have the reference distance $T_1$ in the longitudinal direction. This allows projecting the mark, an indicator of the actual distance, into the shot image, thus making it possible to find the vehicle speed v with high accuracy even in the event of a change in vehicle height.

The two first laser pointers 108a and 108b making up the reference distance mark irradiation unit 108 irradiate the reference distance mark 109 in parallel with the optical axis o of the camera 100. The first laser pointers 108a and 108b are arranged away from each other in the longitudinal direction. This makes it possible to configure the extremely accurate and simple reference distance mark irradiation unit 108 for irradiating light in parallel with the optical axis o of the camera 100 in such a manner as to maintain the reference distance $T_1$. Further, the two first laser pointers 108a and 108b are arranged, one at the front and the other at the rear, relative to the optical axis o of the camera 100. This ensures ease in securing the large reference distance $T_1$, thus contributing to reduced impact of error on image recognition and providing improved calculation accuracy of the vehicle speed v. Still further, the two first laser pointers 108a and 108b are arranged in such a manner that their axial lines are aligned with the optical axis o of the camera 100 in the longitudinal direction. This makes it unlikely that the reference distance $T_1$ will vary even during banking of the motorcycle 10, thus providing improved calculation accuracy of the vehicle speed v.

Further, the second mark 111 is irradiated to the road surface G at a position offset at least to the left of the vehicle relative to the reference distance mark 109 in the shooting range. This makes it possible to find the bank angle θ of the motorcycle 10. The second mark 111 is formed in such a manner as to have the given distance $T_2$ in the longitudinal direction. The second mark irradiation unit 110 irradiates the second mark 111 in parallel with the optical axis o of the camera 100. This makes it possible to find the bank angle θ of the motorcycle 10 with high accuracy.

The two second laser pointers 110a and 110b making up the second mark irradiation unit 110 irradiate the second mark 111 in parallel with the optical axis o of the camera 100 and are arranged away from each other in the longitudinal direction. This makes it possible to configure the extremely accurate and simple second mark irradiation unit 110 for irradiating light in parallel with the optical axis o of the camera 100 in such a manner as to maintain the reference distance $T_2$. Further, the two second laser pointers 110a and 110b are provided, one at the front and the other at the rear, relative to the optical axis o of the camera 100. This ensures ease in securing the large given distance $T_2$, thus contributing to reduced impact of error on image recognition and providing improved calculation accuracy of the bank angle θ of the motorcycle 10. Still further, the two second laser pointers 110a and 110b are arranged in such a manner that their axial lines are aligned in the longitudinal direction. This makes it unlikely that the given distance $T_2$ will vary even during banking of the motorcycle 10, thus providing improved calculation accuracy of the bank angle θ of motorcycle 10.

The reference distance mark irradiation unit 108 and the second mark irradiation unit 110 are attached to the camera 100. This ensures high parallelism of the optical axes of the first and second laser pointers 108a, 108b, 110a and 110b with the optical axis o of the camera 100, thus providing improved calculation accuracy of the vehicle speed v.

The camera 100 is arranged at least below the engine 28a or the vehicle body frame 12. As a result, the second mark irradiation unit 110 is arranged on one side of the camera 100, with the exhaust pipe 118 running on the other side of the camera 100. This prevents upsizing of the motorcycle 10 as a result of the mounting of the vehicle speed calculator 200, thus making it possible to bring the optical axis o of the camera 100 close to the center of the width of the motorcycle 10 (vehicle width centerline c).

It may be noted that although arranged at a position offset to the left relative to the reference distance mark irradiation unit 108 by the distance D1 in the present embodiment, the second mark irradiation unit 110 may be arranged at a position offset to the right relative to the reference distance mark irradiation unit 108 by the distance D1. In this case, the optical axis o of the camera 100 can be brought close to the vehicle width centerline c of the motorcycle 10 by running the exhaust pipe 118 on the left side of the camera 100.

Although arranged where the optical axis o is offset to the left from the vehicle width centerline c, the camera 100 may be arranged where the optical axis o is offset to the right from the vehicle width centerline c. Of course, it is preferred that the camera 100 should be provided in such a manner that the optical axis o is aligned with the vehicle width centerline c.

Also, although arranged at a position offset to the left relative to the reference distance mark irradiation unit 108 by the distance D1, the second laser pointers 110a and 110b may be arranged at positions offset, one to the left and the other to the right, by the distance D1.

Further, although the vehicle speed calculator 200 is provided below the engine 28a in the present embodiment, it is acceptable as long as the vehicle speed calculator 200 is provided below the vehicle body frame 12. On the other hand, although a description has been given with reference to the motorcycle 10, the vehicle may be a three- or four-wheeled vehicle as long as it is a rocking vehicle.

Although calculating the bank angle θ by using Formulas (2) to (6) given above, the bank angle calculation unit 222 may calculate the bank angle θ by using the approach described below. In this case, the bank angle calculation unit 222 detects an offset distance (distance along the vehicle width) $Y_3$ [pixels] (FIG. 8) between the reference distance mark 109 irradiated by the reference distance mark irradiation unit 108 and the second mark 111 irradiated by the second mark irradiation unit 110 in the shot image. Then, the bank angle calculation unit 222 finds the bank angle θ based on the ratio of the offset distance D1 to the reference distance $T_1$ ($D1/T_1$) and the ratio of the offset distance $Y_3$ to the image reference distance $Y_1$ ($Y_3/Y_1$).

Further, although a description has been given of the above embodiment with reference to the engine 28a, it is acceptable as long as the prime mover serves as a driving source of a rocking vehicle, and an electric motor may be used as a prime mover. In this case, the rotary shaft adapted to rotate integrally with the rotor of the electric motor serves as a main shaft.

A description has been given above of the present invention with reference to the preferred embodiment. However, the technical scope of the present invention is not limited to the scope described in the above embodiment. It is apparent to those skilled in the art that various changes and modifications can be made to the above embodiment. It is apparent from the scope of the claims that the technical scope of the present invention also includes embodiments with such changes or modifications. On the other hand, the reference symbols in round brackets appearing in the scope of the claims have been added to imitate those given in the accompanying drawings for easy understanding of the present invention. The present invention is not to be interpreted as being limited to the elements with the reference symbols.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE SYMBOLS

10 Motorcycle
12 Vehicle body frame
14 Head pipe
18 Front wheel
20 Handle
25 Swing arm pivot shaft
28 Power unit
28a Engine
28b Transmission
29 Crankshaft
30 Rear wheel
32 Swing arm
34 Step
38 Bank sensor
62 Under cowl
100 Camera (image capturing unit)
102 Stay
104 Oil pan
105 Concave portion
106 Lens barrel
108 Reference distance mark irradiation unit
108a, 108b, 110a, 110b Laser pointer
109 Reference distance mark
110 Second mark irradiation unit
111 Second mark
112, 114, 116 Opening
118 Exhaust pipe
200 Vehicle speed calculator
202 Control section
210 Camera control unit
212 Irradiation control unit
214 Traveled distance detection unit
216 Image reference distance detection unit
218 Vehicle speed calculation unit
220 Image given distance detection unit
222 Bank angle calculation unit.

What is claimed is:

1. A vehicle speed calculator comprising:
an image capturing unit attached to a vehicle, the image capturing unit configured to capture an image of a road surface on which the vehicle is traveling;
a traveled distance detection unit which detects a traveled distance per unit time of a feature point in a shooting range captured by the image capturing unit in a shot image;
a vehicle speed calculation unit which calculates a vehicle speed of the vehicle relative to the road surface from the traveled distance detected by the traveled distance detection unit;
a reference distance mark irradiation unit which irradiates, to the road surface, a reference distance mark formed in such a manner as to have a reference distance from the vehicle in a longitudinal direction of the vehicle in the shooting range in parallel with an optical axis of the image capturing unit; and
an image reference distance detection unit which detects an image reference distance, which is the longitudinal length of the reference distance mark irradiated by the reference distance mark irradiation unit in the shot image;
wherein:
the vehicle speed calculation unit calculates the vehicle speed from the traveled distance using the reference distance and the image reference distance detected by the image reference distance detection unit;
the reference distance mark irradiation unit irradiates the reference distance mark in parallel with the optical axis of the image capturing unit; and
the reference distance mark irradiation unit comprises at least two laser pointers that are arranged away from each other in the longitudinal direction of the vehicle.

2. The vehicle speed calculator of claim 1, wherein the two first laser pointers of the reference distance mark irradiation unit are arranged, one at the front and the other at the rear, relative to the optical axis of the image capturing unit.

3. The vehicle speed calculator of claim 1, wherein the two first laser pointers of the reference distance mark irradiation unit are arranged in such a manner that their axial lines are aligned in the longitudinal direction of the vehicle.

4. The vehicle speed calculator of claim 2, wherein the two first laser pointers of the reference distance mark irradiation unit are arranged in such a manner that their axial lines are aligned in the longitudinal direction of the vehicle.

5. The vehicle speed calculator of claim 3, wherein the two first laser pointers of the reference distance mark irradiation unit are arranged in such a manner that their axial lines are further aligned with the optical axis of the image.

6. The vehicle speed calculator of claim 1, wherein the reference distance mark irradiation unit is attached to the image capturing unit.

7. The vehicle speed calculator of claim 1, further comprising:
a second mark irradiation unit which irradiates, to the road surface, a second mark at a position offset at least in a horizontal direction of the vehicle relative to the reference distance mark in the shooting range.

8. A vehicle speed calculator comprising:
an image capturing unit attached to a vehicle, the image capturing unit configured to capture an image of a road surface on which the vehicle is traveling;
a traveled distance detection unit which detects a traveled distance per unit time of a feature point in a shooting range captured by the image capturing unit in a shot image;
a vehicle speed calculation unit which calculates a vehicle speed of the vehicle relative to the road surface from the traveled distance detected by the traveled distance detection unit;
a reference distance mark irradiation unit which irradiates, to the road surface, a reference distance mark formed in such a manner as to have a reference distance from the vehicle in a longitudinal direction of the vehicle in the shooting range in parallel with an optical axis of the image capturing unit;
an image reference distance detection unit which detects an image reference distance, which is the longitudinal length of the reference distance mark irradiated by the reference distance mark irradiation unit in the shot image; and
a second mark irradiation unit which irradiates, to the road surface, a second mark at a position offset at least in a horizontal direction of the vehicle relative to the reference distance mark in the shooting range; wherein:

the vehicle speed calculation unit calculates the vehicle speed from the traveled distance using the reference distance and the image reference distance detected by the image reference distance detection unit, the second mark is formed at a position offset at least in the horizontal direction in such a manner as to have a given distance in the longitudinal direction of the vehicle, and the second mark irradiation unit irradiates the second mark in parallel with the optical axis of the image capturing unit.

9. The vehicle speed calculator of claim 8, wherein:

the second mark irradiation unit comprises two second laser pointers that are arranged away from each other in the longitudinal direction of the vehicle.

10. The vehicle speed calculator of claim 9, wherein the two second laser pointers of the second mark irradiation unit are arranged, one at the front and the other at the rear, relative to the optical axis of the image capturing unit.

11. The vehicle speed calculator of claim 9, wherein the two second laser pointers of the second mark irradiation unit are arranged in such a manner that their axial lines are aligned in the longitudinal direction of the vehicle.

12. The vehicle speed calculator of claim 10, wherein the two second laser pointers of the second mark irradiation unit are arranged in such a manner that their axial lines are aligned in the longitudinal direction of the vehicle.

13. The vehicle speed calculator of claim 8, wherein the second mark irradiation unit is attached to the image capturing unit.

14. The vehicle speed calculator of claim 8, wherein:

the vehicle is a motorcycle including a vehicle body frame, an engine mounted on the vehicle body frame, and an exhaust pipe extending from the engine;

the image capturing unit is arranged at least below one of the engine and the vehicle body frame; and the second mark irradiation unit is arranged on one side of the image capturing unit, with the exhaust pipe running on the other side of the image capturing unit.

\* \* \* \* \*